(12) United States Patent
Derderian et al.

(10) Patent No.: US 8,372,939 B1
(45) Date of Patent: Feb. 12, 2013

(54) TRANSPARENT POLYURETHANES

(75) Inventors: Edmond Derderian, Charleston, WV (US); Richard Gerkin, Cross Lanes, WV (US)

(73) Assignee: PolyPlexx, LLC, South Charleston, WV (US)

( * ) Notice: Subject to any disclaimer, the term of this patent is extended or adjusted under 35 U.S.C. 154(b) by 541 days.

(21) Appl. No.: 12/541,993

(22) Filed: Aug. 17, 2009

(51) Int. Cl.
| C08G 18/50 | (2006.01) |
| C08G 18/32 | (2006.01) |
| C08G 18/73 | (2006.01) |
| C08G 18/48 | (2006.01) |

(52) U.S. Cl. ............................................ 528/76; 528/77
(58) Field of Classification Search .................... 528/76, 528/77
See application file for complete search history.

(56) References Cited

U.S. PATENT DOCUMENTS

| 4,101,529 A | 7/1978 | Ammons |
| 4,433,067 A | 2/1984 | Rice et al. |
| 4,474,900 A | 10/1984 | Dominguez |
| 4,530,941 A | 7/1985 | Turner et al. |
| 4,642,320 A | 2/1987 | Turner et al. |
| 4,686,242 A | 8/1987 | Turner et al. |
| 4,764,543 A | 8/1988 | Savina et al. |
| 4,806,615 A | 2/1989 | Rice et al. |
| 4,849,460 A | 7/1989 | Bentley et al. |
| 4,994,540 A | 2/1991 | Boerner et al. |
| 5,079,327 A | 1/1992 | Sarpeshkar et al. |
| 5,239,041 A | 8/1993 | Grigsby, Jr. et al. |
| 5,502,147 A | 3/1996 | Nodelman et al. |
| 5,510,445 A | 4/1996 | Haider et al. |
| 5,710,230 A | 1/1998 | Steppan et al. |
| 5,739,253 A | 4/1998 | Nodelman et al. |
| 6,562,932 B1 | 5/2003 | Markusch et al. |
| 6,632,875 B2 | 10/2003 | Markusch et al. |
| 8,178,644 B2 * | 5/2012 | Derderian et al. ............. 528/60 |

FOREIGN PATENT DOCUMENTS

WO   WO/2007/050542   5/2007

* cited by examiner

*Primary Examiner* — Rabon Sergent

(57) ABSTRACT

The present invention teaches a new process to produce novel, hard, optically clear, impact-resistant polyurethane polymers that are characterized by excellent thermo mechanical properties and chemical resistance, and the polymers made as a result of such a process.

The polyurethanes are made by reacting in a one step process
1) a stoichiometric excess of aliphatic polyisocyanate whereby the index is between 95 to 120;
2) a primary amine-terminated polyether with an amine functionality of about 2 and a molecular weight of greater than 400;
3) a polyol having an average hydroxyl functionality greater than or equal to 2 and an average hydroxyl equivalent weight of from about 300 to about 2,000, and
4) an aromatic diamine;
wherein component 3 must less be present in a ratio of less than five to one stoichiometric equivalents relative to equivalents of component 2, and
5) optionally, a cross linking agent.

20 Claims, No Drawings

TRANSPARENT POLYURETHANES

SCOPE OF INVENTION

The present invention relates to hard, optically clear, impact-resistant polyurethanes that are characterized by excellent thermo mechanical properties and chemical resistance.

BACKGROUND OF THE INVENTION

Polyurethanes are a known class of materials that have found extensive commercial application because of their excellent physical properties. These polymers are suitable for molding, spraying, and coating products where tensile strength, toughness, and impact resistance are required. In many of the established manufacturing processes it is preferred to employ a one-shot system whereby the polyisocyanate and active hydrogen compounds are converted to the final product in a single reaction step. In other known processes an intermediate product, usually called a prepolymer, is formed first by reacting a stoichiometric excess of a polyisocyanate with an active hydrogen compound, and the prepolymer is subsequently converted to the final polymer in a second reaction involving a further active hydrogen compound.

An example of polyurethane chemistry is disclosed in U.S. Pat. No. 4,686,242 to Turner et al. which teaches a process whereby an amine functional compound having an equivalent weight of at least about 400 is reacted with an excess of a polyisocyanate to form an isocyanate-terminated prepolymer, which prepolymer is further reacted with a polyol. Polymer properties were better when made via a prepolymer route as compared to a one step process (col. 1 lines 31-49). The patent also teaches that primary amines tend to react too quickly with isocyanates in a one step process, so a two step process should be used. Additionally, Turner teaches the use of sterically hindered amines in lieu of primary amines so as to control this reactivity.

Another example of urethane chemistry is set forth in U.S. Pat. No. 5,510,445 to Haider, et. al., which teaches a one step process for the formation of polyurethanes, comprising reacting at an isocyanate index of from 90 to 200 (a) diisocyanates; (b) 25 to 70 equivalent percent, relative to the total of components (b) and (c), of one or more amine-terminated polymers containing at least two aromatically bound isocyanate-reactive primary or secondary amino groups and/or aliphatically bound isocyanate-reactive secondary amino groups; and (c) 75 to 30 equivalent percent, relative to the total of components (b) and (c), of one or more aromatic diamine chain extenders having a molecular weight of from 108 to 399. This art teaches that large amounts of the amine-terminated polymers and any amine chain extenders contain exclusively aromatically bound primary or secondary amino groups and preferably also contain alkyl substituents. Moreover, Comparative Examples 7 and 8 teach that a primary amine terminated polyether is too reactive for a one step process methodology and should be avoided.

U.S. Pat. No. 5,710,230 to Steppan relates to a process for the production of polyurethane by processing the reaction mixture consisting of a diisocyanate and an isocyanate-reactive component via a one-shot process at an isocyanate index of about 80 to 130. The isocyanate-reactive component consists of 1) at least one polyol having functional groups which are hydroxyl groups, amine groups, or mixtures of hydroxyl groups and amine groups such that the equivalent ratio of hydroxyl groups to amine groups is from 0:1 to 1:1, and 2) at least one chain extender which is selected from diols, triols, primary aliphatic amines, secondary aliphatic amines, aminoalcohols and mixtures thereof. The equivalent ratio of hydroxyl groups to amine groups in the chain extender component is from 1:2 to 10:1. Steppan does not teach the use of aromatic diamines as chain extenders.

U.S. Pat. No. 5,239,041 to Grigsby teaches a process for preparing a polyurethane made from hindered polyether-polyamine that is obtained by reacting a polyol having two or more hydroxyl groups with an effective amount of long chain alkyl epoxide to give an at least partially hindered intermediate having hydroxyl terminations; and then aminating at least one of the hydroxyl terminations on the intermediate to primary amine groups to give an at least partially hindered polyetherpolyamine. The hindered polyetherpolyamine is then reacted with a polyisocyanate. This art teaches that the long chain alkyl group provides steric hindrance to the primary aliphatic amine group, which slows down the reactivity of the amine, which is said to be useful since it allows for longer shot or flow times, which in turn permit larger parts to be made from existing equipment.

SUMMARY OF THE INVENTION

The present invention teaches a new process to produce hard, optically clear, impact-resistant polyurethane polymers that are characterized by excellent thermo mechanical properties and chemical resistance, which are made in a one step process from a primary amine-terminated polyether, an aliphatic polyisocyanate, a polyol and an aromatic diamine.

DETAILED DESCRIPTION OF THE INVENTION

The novel polyurethane of the present invention is made using a one step process in which a polyurethane is made from a primary amine-terminated polyether, an aliphatic polyisocyanate, a polyol and an aromatic diamine. Surprisingly, the resulting polymers are both optically clear and very hard, are impact resistant and are characterized by excellent thermo mechanical properties and chemical resistance.

More specifically, the polyurethane is the one step reaction product of:
1) a stoichiometric excess of aliphatic polyisocyanate whereby the index is between 95 and 120
2) a primary amine-terminated polyether with an amine functionality of about 2 and a molecular weight of equal to or greater than 400;
3) a polyol having an average nominal hydroxyl functionality greater than or equal to 2 and an average hydroxyl equivalent weight of from about 300 to about 2,000, and
4) an aromatic diamine.
wherein component 3 is present in a ratio of less than five to one relative to stoichiometric equivalents of component 2; and
5) optionally, a cross linking agent.

More preferably the polyurethane is the one step reaction product of:
1) a cycloaliphatic polyisocyanate
2) a primary amine-terminated polyether diamine of 2000 to about 2500 molecular weight and
3) A polyol selected from the group consisting of (a) a polyester polyol triol with a molecular weight of between about 500 and 900, or (b) a polyether glycol with a molecular weight of between about 600 and 2000, or (c) a polyester polyol diol with a molecular weight of between about 400 and 2,000, and
4) an aromatic diamine.

wherein component 3 is present in a ratio of less than two to one relative to stoichiometric equivalents of component 2.

(5) A fifth component of a cross linking agent may be added as well.

Referencing components 1-5 above, the following table sets forth the desired ratios of stoichiometric equivalents of these reactants in the one step process. The high and low are individual ranges for the referenced components, not specific combinations given the potential ranges that may be specified amongst the five components.

| Ratios in equivalents | Low | High | Preferred Range |
|---|---|---|---|
| 1/2 | 9 | 24 | 12-20 |
| 1/(2 + 3 + 5) | 2.7 | 4.5 | 3-4.2 |
| 3/2 | 0.49 | 4.99 | 1.5-3.5 |
| 5/4 | 0 | 0.2 | .1-.175 |
| 4/(2 + 3 + 5) | 1.7 | 3.5 | 2-3.0 |

The index referenced above is the ratio, multiplied by 100, between the stoichiometric equivalents of isocyanate and the sum of the stoichiometric equivalents of all isocyanate-reactive groups.

The resulting polymer is clear with the following properties: Vicat softening point (ASTM D 1525, Version A, load=10N) of >98° C., a hardness of >75 (ASTM D 2240-00, D durometer), a flexural modulus of >100,000 psi (ASTM D 790), and passes a "falling dart" impact test [Falling Dart Impact (Gardner) ASTM D3029, with no fracture of the polymer (weight is 900 g, impact tip is 0.31 cm radius, falling a distance of 107 cm, polymer resting on a support plate of inner diameter of 5.08 cm)]. The polymers should have an optical transmittance of >83%.

The term "amine functionality" as used above in defining the primary amine terminated polyether used in making the compositions of the invention means the amino functionality that a polyether would be expected to have in regard to the materials used in its manufacture. For example, a primary amine-terminated polyether prepared by the reductive amination of a polyether diol will have a nominal amino functionality of 2 although, in practice, the average hydroxyl functionality of the diol may be somewhat less than 2 and the conversion of hydroxyl to amino groups may not be entirely complete. The resulting structure is an aliphatic primary amine terminated polyether material.

The amino equivalent weight of the amine-terminated polyether is at least about 200, and is preferably in the range from about 950 to about 1250. Mixtures of two or more amine-terminated polyethers varying in functionality, equivalent weight or chemical constitution may be used provided such mixtures conform to the average functionality and average equivalent weight criteria displayed above. Polyoxypropylene diamines and poly(oxyethylene-oxypropylene) diamines and mixtures of any of these are preferred. However, the amines should be essentially, and more preferably, free of, other isocyanate reactive groups.

The organic polyisocyanates that can be employed include aliphatic and cycloaliphatic diisocyanates and combinations thereof. Cycloaliphatic diisocyanates are preferred in the present invention. Representative of these types of diisocyanates are 4,4' dicyclohexylmethane diisocyanate, bis(1,4-isocyanatomethyl)cyclohexane, isophorone diisocyanate, and other similar diisocyanates.

The term "hydroxyl functionality" as used above means the hydroxyl functionality that a polyol would be expected to have in regard to its monomeric components. For example, a polyol prepared by the addition of propylene oxide to a diol will have a hydroxyl functionality of 2 although, in practice, its average functionality will be somewhat less than 2. Thus, for a polyether, the average hydroxyl functionality is the average functionality (number of active hydrogen atoms) of the initiator or initiators used in its preparation.

The average hydroxyl functionality of the polyol used in compositions of the invention is typically from 2 to 6. The average hydroxyl equivalent weight of the polyol is preferably in the range from 300 to 2000. Mixtures of two or more polyols varying in equivalent weight or chemical constitution may be used provided such mixture conform to the average functionality and average equivalent weight criteria displayed above.

Examples of suitable polyols include polyesters, polycarbonates, hydroxyl-terminated polyolefins and, especially, polyethers. Suitable polyether polyols or mixtures of polyols may be selected from the reaction products of propylene oxide or propylene and ethylene oxides with polyfunctional initiators such as water, ethylene glycol, propylene glycol, diethylene glycol, glycerol, trimethylolpropane, pentaerythritol, triethanol amine, ethanol amine, triisopropanol amine or sorbitol. Especially useful polyethers include polytetramethylene ether glycols and polyoxypropylene triols and poly (oxyethylene-oxypropylene) triols obtained by the simultaneous or sequential addition of ethylene and propylene oxides to trifunctional initiators. In some cases, ethylene oxide tipped triols are preferred because of their enhanced reactivity. Polyesters obtained by the ring-opening polymerization of lactones, for example caprolactone, in the presence of a polyol and a catalyst, are a preferred polyol.

Preferably, the polyol should be essentially free of, and more preferably free of, isocyanate reactive groups other than the hydroxyl functionality.

Suitable aromatic diamines that can be employed herein include for example, 2,4-bis (p-aminobenzyl) aniline, 2,4-diaminotoluene, 2,6-diaminotoluene, 1,3-phenylenediamine, 1,4-phenylenediamine, 2,4'-diaminodiphenyl methane, 4,4'-diaminodiphenyl methane, naphthalene 1,5-diamine, 1 methyl-2-methylamino 4-amino benzene, polyphenyl polymethylene polyamines, 1,3-diethyl 2,4-diaminobenzene, 1,3, 5-triethyl 2,6-diamino benzene, mixtures thereof and the like. Preferred aromatic diamines include methylenebis orthochloroaniline (MOCA) and diethyltoluenediamine (a blend of 1-methyl-3,5-diethyl-2,6-diamino benzene and 1-methyl-3,5-diethyl-2,4-diamino benzene, also known as DETDA). An optional class of diamines is those that include non-reactive heteroatoms such as sulfur, such as dimethylthiotoluenediamine. Preferably the diamine is free of hydroxyl functionalities.

The cross linking agent that may be added on an optional basis to the reaction has isocyanate reactive groups, a functionality of equal or greater than about 3, and a molecular weight<400. Functionality refers to the number of isocyanate reactive groups on average on each molecule. Trimethylol propane, glycerine (a triol) and pentaerythritol (a quadrol) are all exemplary of such crosslinkers.

A catalyst may be optionally employed in the preparation of the polyurethane. The most preferred catalysts are those metallo-organic catalysts which include, for example, stannous acetate, stannous butyrate, stannous laurate, stannous octoate, stannous oleate, bismuth octoate, cobalt naphthenate, zinc naphthenate, cadmium naphthenate, dibutyltin dilaurate, dibutyltin-di-2-ethylhexoate, dimethyltin dineodecanoate and the like.

Other suitable urethane catalysts which may be used include tertiary amines such as, for example, triethylenediamine, N-methyl morpholine, N-ethyl morpholine, diethyl ethanolamine, 1-methyl-4-dimethylaminoethyl piperazine, 3-methoxy-N-dimethylpropyl amine, N,N-dimethyl-N',N'-methyl isopropyl propylenediamine, N,N-dimethyl-3-diethylaminopropyl amine, dimethyl benzyl amine and the like.

The quantity of catalyst that is optionally employed is generally dependent upon its activity and/or the temperature of the reaction mass. In general, quantities between about 0.005 and about 2.0 weight percent of catalyst, based on the combined weight of the reactants can be used, with 0.02 to 0.15 wt % being preferred.

Preferred reaction conditions for the manufacture of the polyurethanes of the present invention are: reaction temperatures between about 5 to about 85° C., catalyst concentration between 0.02 and 0.15 wt % of the total, and mold temperature>90° C.

The polyurethanes may be made by reaction injection molding (RIM) whereby the reactive liquid streams are impingement-mixed and rapidly injected into a mold cavity. They may also be made using a urethane casting machine whereby reactive liquid streams are mixed and poured directly into a casting mold for subsequent molding and cure.

The polyurethanes of the present invention may be used according to those known uses of polyurethanes. However, given the clarity and hardness of the polyurethanes of the present invention, preferable uses for them is in the general areas of viewports, lenses, goggles, face shields, and other glazing-type applications. Such products may be formed by casting the reaction mixture into the desired shapes at varying thicknesses. The moldings also may be made by injection molding if no functionality of the system components is greater than about 2.

EXAMPLES

All examples were conducted using the following protocol. The A side (the isocyanate) and the B side (all other components) of the system were prepared and degassed separately. Both sides were then stored at the desired temperature prior to use. A and B sides were then poured together at the correct stoichiometric ratio and mixed using a FlackTek SpeedMixer™ model DAC 400 FVC. The mixed components were then cast directly into a mold (aluminum spacer 0.125 inches thick, tempered glass top and bottom) which was preheated to 150° C. The cast part was allowed to cure in the mold for 30 min. and then removed and allowed to cool. The catalyst used for all experiments was FOMREZ™ UL-28 dimethyl tin dineodecanoate from GE. Catalyst level for all experiments was 0.04% based on total weight of components.

Example 1

A polyurethane according to the present invention was made using the following formulation, where the reactants were allowed to react at ambient temperature.

| Component | Eq. wt. | no of eqs | wt fraction | wt % Hard Segment |
|---|---|---|---|---|
| Jeffamine D-2000 | 980.40 | 0.33 | 0.21 | |
| Terathane 650 | 319.48 | 0.67 | 0.14 | |
| Trimethylolpropane | 44.67 | 0.50 | 0.01 | |
| Ethacure 100LC | 89.15 | 3.38 | 0.20 | |
| H12MDI | 131.18 | 4.88 | 0.43 | 64 |

Jeffamine® D-2000 is a primary amine-terminated polyether (difunctional amine) commercially available from Huntsman Chemicals with an equivalent weight of 980.40. Terathane 650 is a PTMEG-based polyether polyol (Polytetrahydrofuran diol) available from Invista, with an equivalent weight of 319.48. Ethacure 100LC is diethyltoluenediamine (DETDA) commercially available from Albemarle. H12MDI is Dicyclohexylmethane-4,4'-diisocyanate (an aliphatic diisocyanate). Trimethylolpropane is an optional crosslinker. The resulting polymer was completely clear, free of bubbles, had a D durometer hardness of 84 (ASTM D2240-00) and passed the Gardner type impact test. Vicat A softening point was 183° C., and the flexural modulus was 138,000 psi.

Example 2 (Comparative)

The following comparative formulation which has a hard segment content of 64, but which does not contain a polyol was cast using the same protocols as Example 1. The resulting plaque was clear but very brittle, failing a simple bending test.

| Component | Eq. wt. | no of eqs | wt fraction | wt % Hard Segment |
|---|---|---|---|---|
| Jeffamine D-2000 | 980.40 | 1 | 0.36 | |
| Ethacure 100LC | 89.15 | 7.22 | 0.24 | |
| H12MDI | 131.18 | 8.22 | 0.40 | 64 |

Example 3 (Comparative)

The hard segment content of the above comparative formulation was further reduced to 60% to address the brittleness issue experienced in Comparative Example 2 as follows

| Component | Eq. wt. | no of eqs | wt fraction | wt % Hard Segment |
|---|---|---|---|---|
| Jeffamine D-2000 | 980.40 | 1 | 0.40 | |
| Ethacure 100LC | 89.15 | 6 | 0.22 | |
| H12MDI | 131.18 | 7 | 0.38 | 60 |

The resulting plaque was hazy and failed the "falling dart" impact test.

Example 4 (Comparative) and Example 5

Plaques were made from the following composition using a prepolymer approach (Example 4) and a one step approach (that is according to the present invention) (Example 5) using the same casting technique.

| Component | Eq. wt. | no of eqs | wt fraction | wt % Hard Segment |
|---|---|---|---|---|
| Jeffamine D-2000 | 980.40 | 0.33 | 0.23 | |
| Terathane 650 | 319.48 | 0.67 | 0.15 | |
| Ethacure 100LC | 89.15 | 3.42 | 0.21 | |
| H12MDI | 131.18 | 4.42 | 0.41 | 62.5 |

The prepolymer was made by adding the amine terminated polyether directly to the isocyanate at 80° C. with good stirring, and allowing the prepolymer to stand (sealed and under nitrogen) for 16 hr at 70° C. Equivalent weight was then determined and the prepolymer was then allowed to react with the remaining components of the formulation.

The plaque made via the present invention method in one step (Example 5) passed the falling dart impact test (Specified in Example 3), whereas the plaque made via the prepolymer route (Comparative Example 4) failed the falling dart impact test.

We claim:

1. A polyurethane comprising the one step reaction product of:
   a) aliphatic polyisocyanate;
   b) a primary amine-terminated polyether with an amine functionality of about 2 and a molecular weight of equal to or greater than 400;
   c) a polyol having an average nominal hydroxyl functionality greater than or equal to 2 and an average hydroxyl equivalent weight of from about 300 to about 2000;
   d) an aromatic diamine;
   e) optionally, a cross linking agent with isocyanate reactive groups, having a functionality of equal or greater than about 3, and a molecular weight of less than 400 wherein the relative amount of stoichiometric equivalents of the polyisocyanate to isocyanate reactive groups is between 0.95:1 and 1.2:1, the relative amount of stoichiometric equivalents of the polyol to the primary amine terminated polyether is between 0.49:1 and 4.99:1, the ratio in stoichiometric equivalents of components a to b is between 9:1 and 24:1 and the ratio of stoichiometric equivalents of component a to components b, c and e is between 2.7:1 and 4.5:1.

2. The polyurethane according to claim 1 wherein the primary amine-terminated polyether has a molecular weight of about 2,000 to about 2,500.

3. The polyurethane according to claim 2 wherein the polyol is a polyether glycol with a molecular weight of between about 600 and 2000.

4. The polyurethane according to claim 2 wherein the diamine is selected from the group consisting of (a) methylenebis orthochloroaniline and (b) diethyltoluene diamine.

5. The polyurethane according to claim 4 wherein the polyol is a polyether glycol with a molecular weight of between about 600 and 2000.

6. The polyurethane according to claim 1 wherein the primary amine-terminated polyether is a mixture of two or more amine-terminated polyethers.

7. The polyurethane according to claim 6 wherein the ratio in stoichiometric equivalents of components e to d is between 0.1:1-0.175:1.

8. The polyurethane according to claim 6 wherein the stoichiometric ratio of components c to b is between 1.5:1 to 3.5:1.

9. The polyurethane according to claim 6 wherein the polyol is a polyether glycol with a molecular weight of between about 600 and 2000.

10. A process comprising reacting in one step:
    a) aliphatic polyisocyanate;
    b) a primary amine-terminated polyether with an amine functionality of about 2 and a molecular weight of equal to or greater than 400,
    c) a polyol having an average nominal hydroxyl functionality greater than or equal to 2 and an average hydroxyl equivalent weight of from about 300 to about 2,000, and
    d) an aromatic diamine and
    e) optionally, a cross linking agent with isocyanate reactive groups, having a functionality of equal or greater than about 3, and a molecular weight of less than 400 wherein the relative amount of stoichiometric equivalents of the polyisocyanate to isocyanate reactive groups is between 0.95:1 and 1.2:1, the relative amount of stoichiometric equivalents of the polyol to the primary amine terminated polyether is between 0.49:1 and 4.99:1 wherein the ratio in stoichiometric equivalents of components a to b is between 9:1 and 24:1 and the ratio of stoichiometric equivalents of component a to components b, c and the cross linking agent is between 2.7:1 and 4.5:1.

11. The process according to claim 10 wherein the primary amine-terminated polyether has a molecular weight of about 2,000 to about 2500.

12. The process according to claim 11 wherein the polyol is a polyether glycol with a molecular weight of between about 600 and 2000.

13. The process according to claim 12 wherein the aromatic diamines is selected from the group consisting of methylenebis orthochloroaniline and (b) diethyltoluene diamine.

14. The process according to claim 10 wherein the polyol is a polyether glycol with a molecular weight of between about 600 and 2,000.

15. The process according to claim 14 wherein the aliphatic polyisocyanate is a cycloaliphatic polyisocyanate.

16. The process according to claim 15 wherein the ratio in stoichiometric equivalents of components e to d 0.1:1 and 0.175:1.

17. The process according to claim 16 wherein the ratio in 1 stoichiometric equivalents of components a to b is between 12:1 and 20:1.

18. The process according to claim 17 wherein the primary amine-terminated polyether is a mixture of two or more amine-terminated polyethers.

19. The process according to claim 16 wherein the crosslinker is selected from the group consisting of: trimethylol propane, glycerine and pentaerythritol.

20. The process according to claim 13 wherein primary amine-terminated polyether is a mixture of two or more amine-terminated polyethers.

* * * * *